United States Patent [19]

Liggett

[11] Patent Number: 4,554,299
[45] Date of Patent: Nov. 19, 1985

[54] CONTROLLING THE RATE OF DIAMINE CURING AGENTS IN POLYURETHANE CEMENTS

[75] Inventor: Paul E. Liggett, Wooster, Ohio

[73] Assignee: Goodyear Aerospace Corporation, Akron, Ohio

[21] Appl. No.: 722,629

[22] Filed: Apr. 12, 1985

[51] Int. Cl.$^4$ ............................................. C08L 75/06
[52] U.S. Cl. .................................... 523/466; 427/386; 427/387; 427/388.1; 427/388.2; 428/418; 524/874; 525/454; 528/61; 528/64
[58] Field of Search ......................... 523/466; 524/874; 525/454; 528/61, 64; 427/386, 387, 388.1, 388.2; 428/418

[56] References Cited

U.S. PATENT DOCUMENTS

| 3,267,078 | 8/1966 | Damusis | 528/64 |
| 4,247,678 | 1/1981 | Chung | 528/83 |
| 4,496,707 | 1/1985 | Liggett | 528/64 |

Primary Examiner—Maurice J. Welsh
Attorney, Agent, or Firm—P. E. Milliken; E. W. Oldham; J. F. Jones

[57] ABSTRACT

A method for preparing a polyurethane which has good long term flexibility, solvent resistance and resistance to hydrolysis, said method comprising mixing three components just prior to curing said components comprising a prepolymer solution, a cement solution and a crosslinking solution, said crosslinking solution comprising a solvent, an aromatic diamine and the ketimine of an aliphatic diamine.

14 Claims, No Drawings

CONTROLLING THE RATE OF DIAMINE CURING AGENTS IN POLYURETHANE CEMENTS

TECHNICAL FIELD

This invention relates to a process for carefully controlling the rate of cure of polyurethane cements by using as a crosslinking component or curing agent a mixture of an aromatic diamine and a ketimine which is the reaction product of an aliphatic diamine and a carbonyl compound such as a ketone.

BACKGROUND ART

The process of this invention is an improvement over the disclosures of U.S. Pat. Nos. 4,247,678 and 4,496,707. In particular, this invention relates to an improved process for preparing polyurethane products of the type described in U.S. Pat. No. 4,496,707, the improvement comprising the use of a mixture of an aromatic diamine and an aliphatic diamine ketimine curing agent.

It is known to use aromatic diamines as curing agents for polyurethane cements and that the use of aliphatic diamines for this purpose is undesirable because exceedingly fast rates of cure usually occur when the aliphatic diamines are used. Although aromatic diamines are preferred as curing agents for polyurethane cements, they give a slow rate of cure. Ketimines of aromatic diamines have been described as components of certain flexible sealants and corrosion inhibitive primers used to protect the exterior skin and fastener patterns of high performance aircraft at low temperatures. These sealants and primers which are composed of an epoxy resin, pigments including corrosion inhibitor, polyurethane elastomer, ketimine curing agent, and solvents for sprayability are disclosed in U.S. Pat. No. 4,101,497.

Bicyclic aromatic diamines, such as 4,4'-methylene-bis(2-chloraniline) (MOCA), 4,4'-methylenedianiline (MDA), and 4,4'-diaminodiphenylsulfone (SDA) can be used as curing agents for polyurethanes. It would be highly desirable to minimize the use of the bicyclic aromatic diamines and to use in their place to the extent possible, the aliphatic diamines such as metaxylene diamine (MXDA), isophorone diamine (IPDA), 1,3-bis-(aminomethyl)cyclohexane (1,3 BAC) and others which have less apparent carcinogenic potential than the aromatic diamines.

Unfortunately, aliphatic diamines cause much faster rates of cure in polyurethane cements than the aromatic diamines do. This undesirable property has seriously limited the use of aliphatic diamines as curing agents in polyurethane cements.

DISCLOSURE OF INVENTION

I have found that the rate of cure of polyurethane cements can be controlled within carefully predetermined limits by using a mixture of an aromatic diamine and a ketimine of an aliphatic diamine as the curing agent in the polyurethane cement. The ketimine of the aliphatic diamine is readily produced by the Schiff's base reaction of an aliphatic diamine and a carbonyl compound as follows:

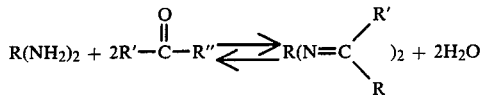

wherein R is an alkyl or aralkyl group, R' is hydrogen or a hydrocarbon group and R" is a hydrocarbon group. In the foregoing reversible reaction, the water formed is removed from the reaction by some known means such as the use of molecular sieves manufactured by Union Carbide Company, silica gel or calcium sulfate to produce the stable ketimine. In practice, the solution of the aliphatic diamine in an excess of ketone plus drying agent is allowed to stand for at least 24 hours at ambient temperature before use in the curing compound.

Aliphatic diamines useful in the practice of this invention include metaxylene diamine (MDA), isophorone diamine (IPDA), 1,3-bis(aminomethyl)cyclohexane (1,3 BAC), ethylene diamine (EDA), methylene bis(cyclohexylamine)($H_{12}$MDA) and metatetramethylenexylene diamine (MTMXDA), and the like.

Carbonyl compounds useful in the preparation of ketimines used in this invention include ketones, such as methyl ethyl ketone, methyl isobutyl ketone, acetone, and the like.

I have found that the use of mixtures of an aromatic diamine and an aliphatic diamine, per se, will not modify the cure rate of polyurethane cements. In such cases, the fast rate caused by the aliphatic diamine takes over and the modifying influence one might expect from the aromatic diamine is not observed. It is only when the aliphatic diamine is in the form of its ketimine that the cure rate can be controlled by use of the blends of curing agents in accordance with this invention. Preferred blends of this invention are composed of solutions of an aromatic diamine and the ketimine of an aliphatic diamine.

This invention will allow the close control of the cure rate for polyurethane cements without adversely affecting the fuel and hydrolysis resistance of the cured product.

The cure rate for a given polyurethane cement formulation is set by the rate associated with a given curing agent. Slight variations in cure rate for a given curing agent can be achieved by using more curing agent to increase the rate or by using plasticizers to decrease the rate, but both of these methods for slightly altering rate are detrimental to the fuel resistance and hydrolysis resistance of the cured polyurethane fuel tank material. Ambient conditions such as temperature and humidity can also have some minor effect on cure rate of polyurethane cements but they are not controllable in the less than ideal environment found in most fuel tank production facilities. Long term retention of good physical properties in flexible fuel tank bladder applications is important because the bladder often must be removed and later replaced after repairs or alterations are made to the fuel tank. Such procedures are not possible or are extremely difficult if the fuel tank liner becomes too stiff on aging. The fuel tanks prepared by the process of this invention retain flexibility and other desirable properties such as fuel and hydrolysis resistance over long periods of time.

Thus, the primary purpose of this invention is to provide a means for the accurate control of the cure rate of polyurethane cements by the careful selection of a combination of an aromatic diamine and a ketimine of an aliphatic diamine as curing agent for said cements.

In general, a process for preparing a urethane formulation, comprising the steps of: separately preparing a polymer component, said polymer component comprising a urethane prepolymer and a urethane solvent; separately preparing a curing component, said curing component being composed of a mixture of an aliphatic diamine ketimine and an aromatic diamine curing agent and a solvent; separately preparing a cement component, said cement component comprising an epoxy having solvent leaching resistance, and a solvent; a thixotropic compound, said thixotropic compound located in said curing component, or in said cement component, or in both; the total amount of solids in said overall formulation ranging from about 20 percent to about 60 percent by weight based upon the total amount of said solvents and said solids in said overall formulation.

In general, a polyurethane, said polyurethane made by separately preparing a polymer component, a curing component, and a cement component; said polymer component comprising a urethane prepolymer and a urethane solvent, said curing component being composed of a mixture of an aromatic diamine and an aliphatic diamine ketimine curing agent and a curing agent solvent, said cement component comprising an epoxy having solvent leaching resistance, and a solvent; a thixotropic compound, said thixotropic compound located in said curing component, or in said cement component, or in both; said urethane produced by mixing said three components together and curing at a temperature of from about ambient to about 180° F.

In the curing agent mixture the proportion of the aromatic diamine to the ketimine of the aliphatic diamine (expressed in terms of aliphatic diamine) should fall in the range of from 10 to 90, and preferably from about 10 to 50 percent by weight, respectively.

BEST MODE FOR CARRYING OUT THE INVENTION

According to the present invention, a polyurethane is made by preparing three separate components. Prior to application or upon application, the components are mixed together and applied to a substrate or item. Each of the separate components has good stability and hence the paint or coating has a good shelf life. The urethane, when applied, has very good sealant properties, is free from agglomerates, and is resistant to fuels.

One of the components is a urethane component in which a urethane prepolymer is dissolved in a solvent. A curing agent component is composed of a mixture of an aromatic diamine and an aliphatic diamine ketimine curing agent dissolved in a solvent. The last component is a cement solution which generally contains an epoxy, an optional leveling agent, and a solvent. A thixotropic compound can be contained in either the cement component, the cure component, or in both, generally depending upon the pressure limitations of the spraying apparatus to be used for dispensing the formulation. When combined, the components form a polyurethane formulation generally having an overall solids content of from about 20 percent to about 60 percent, preferably from about 40 percent to about 50 percent, and optionally about 42 to 43 percent by weight based upon the total weight of the polyurethane formulation containing all three components. The solids content is generally important in that too much solvent results in loss of an adhesive type film because the polyurethane, when used as a coating or paint, would tend to run whereas the use of too little solvent would result in a porous layer.

The polymer component comprises a polyester urethane prepolymer such as that set forth in U.S. Pat. No. 4,247,687 which is hereby incorporated by reference. Essentially, the urethane prepolymer is made by reacting an aliphatic or alicyclic polyisocyanate, preferably an alkyl or a cycloalkyl polyisocyanate, with a polyester derived from the reaction of a glycol and a mixture of or co-condensation of an aliphatic dicarboxylic acid, preferably an alkyl dicarboxylic acid, and/or an aromatic dicarboxylic acid. The aliphatic or alkyl polyisocyanate can contain from 3 to 12 or more carbon atoms, with from 6 to 10 being preferred, and the alicyclic or cycloalkyl polyisocyanate can have from 5 to 25 or more carbon atoms, with from 8 to 15 being preferred. Generally, diisocyanates are preferred. An example of a preferred polyisocyanate is methylenebis(4-cyclohexylisocyanate), sold under the trademark Desmodur W, by Mobay Chemical Corporation.

Suitable polyols include those having a molecular weight of 500 or less, or desirably 200 or less. Preferably, the polyol is a glycol containing at least 2 carbon atoms as from 2 to about 10 carbon atoms, with from about 4 to about 6 being desired. Examples of specific glycols include 1,6-hexane diol, 1,4-butane diol, and ethylene glycol. The various hexane diols are preferred. Aliphatic or alkyl dicarboxylic acids generally contain from about 2 to about 12 carbon atoms and preferably from about 6 to 9 carbon atoms. Specific examples include glutaric acid, adipic acid, and pimelic acid, with azelaic acid being preferred. Similarly, the aromatic dicarboxylic acids can contain from 8 to about 12 carbon atoms with 8 carbon atoms being preferred. Examples of such acids include terephthalic acid, isophthalic acid, and naphthalene dicarboxylic acid, and the like, with isophthalic acid being preferred. The ratio of the aliphatic dicarboxylic acids to the aromatic acids in either the copolymerization reaction or as a physical mixture varies from 10 to 90 percent by weight. The polyester is formed by the reaction of the acids and the glycol according to any conventional process and generally has a molecular weight of from about 500 to about 4,000, with from about 1,000 to about 3,000 being preferred. The ratio of the equivalent amount of isocyanate used to the equivalent amount of hydroxy end groups in the polyester ranges from about 1.5 to about 3.0 and preferably from about 1.8 to about 2.2.

Any conventional solvent can be utilized to dissolve the urethane prepolymer. Specific examples include aromatic compounds having from 6 to 10 carbon atoms and aliphatic, preferably alkyl substituted compounds, having from 3 to 8 carbon atoms. Examples of aromatic solvents include xylene, toluene, benzene, and the like, whereas examples of aliphatic compounds include methyl ethyl ketone, methyl isobutyl ketone, and the like. An amount of solvent is utilized such that the amount of urethane prepolymer solids in the polymer component ranges from about 50 to about 75 percent, desirably from about 60 to about 65 percent, and optimally from about 63 to about 65 percent by weight.

The cure component is composed of a mixture of an aromatic diamine and an aliphatic diamine ketimine curing agent in a solvent. The preferred aliphatic diamines include alkyl diamines containing from 2 to 10 carbon atoms, cycloalkyl diamines containing from 4 to 20 carbon atoms, and alkaryl diamines containing from 8 to 20 carbon atoms. The preferred aromatic diamines useful in the curing agent mixtures of this invention include monocyclic aryl diamines containing from 6 to 12 carbon atoms and bicyclic aryl diamines containing from 12 to 20 carbon atoms.

The curing agent mixture is dissolved in any conventional solvent such as the same solvents utilized with the urethane polymer, for example, a ketone or an aliphatic hydrocarbon solvent. Examples of specific preferred solvents include methyl ethyl ketone, methyl isobutyl ketone, and the like. The amount of solvent is such that the amount of aromatic diamine and aliphatic diamine ketimine contained therein generally ranges from about 5 to about 30 percent, and optimally about 13 to about 15 percent by weight. Of course, it should be understood that the amount of solvent in the cure component, as in the polymer component, can be varied over a wide range so long as the total solvent or percent solids in the final paint, when all three components are combined, is as set forth above. The amount of diamine (the aliphatic part of which is in the form of its ketimine) when combined with the polymer component is such that the equivalent ratio of diamine to diisocyanate ranges from about 0.8 to about 1.2 and desirably from about 0.9 to about 0.95, and optimally about 0.93. Excessive amounts of diamine will result in reduced hydrolysis resistance whereas too small amounts will result in unsuitable solvent or jet fuel resistance and a reduced cure rate.

Inasmuch as the overall polyurethane formulation is generally based upon 100 parts by weight of the urethane prepolymer, the amount of the urethane solvent can be readily calculated therefrom. Similarly, the amount of the mixture of aromatic diamine and the aliphatic diamine ketimine can readily be calculated by the equivalent ratio of diisocyanate to the combined diamines. Hence, the amount of diamine and diamine ketimine solvent also readily can be determined.

The third component, that is the cement component, generally comprises a leveling agent, an epoxy compound, and a solvent. Moreover, either the cement component, the cure component, or both can contain a thixotropic agent. Should the polyurethane formulation be sprayed at a relatively low pressure, for example, at 125 psi or less, at 100 psi or less, or even at 50 psi or less, the thixotropic agent is desirably blended in the cure component when a pigment is utilized. Otherwise at low pressures when a pigment is used in a cement component, agglomerations, globules, etc., usually form due to contact of the thixotropic agent and that pigment. Such agglomerations can often jam up the spray gun and/or result in a rough coating surface. Such a problem can be eliminated if the formulation is strained as through an 80 to 100 mesh screen. However, this process is not practical in large batch operations since the straining must be performed on cement that contains the mixture of aromatic diamine and aliphatic diamine ketimine curing agent. Such could result in permanent clogging of the strainer with reacted urethane. The thixotropic agent is important in that it is utilized to generally keep the polyurethane cement from running. The amount of thixotropic agent generally ranges from about 2 parts to about 8 parts by weight based upon 100 parts by weight of urethane prepolymer in the overall polyurethane formulation, and desirably from about 3 to about 6 parts. Generally, any conventional thixotropic compound can be used. Suitable thixotropic agents include silicon dioxide, Cab-O-Sil (Cabot Corp.) surface modified aluminum silicate, manufactured by Georgia Kaolin Company and sold under the brand name "Kaophile #2," and the like. These compounds generally exist as very fine particles so that they can be incorporated in the overall polyurethane formulation and sprayed as from a spray gun.

Although a leveling agent is generally utilized such that the paint surface is smooth, it need not always be included in the paint formulation. Generally, any conventional leveling agent can be utilized such as cellulose acetate butyrate and "Modaflow," manufactured by Monsanto Industrial Chemicals Company. The amount of the leveling agent generally varies from about 0.5 parts by weight to about 3 parts by weight, based upon 100 total parts by weight of urethane in the formulation. A more desired range is from about 0.5 parts to about 1.25 parts by weight. Inasmuch as the leveling agent tends to reduce surface tension and hence tends to counteract a thixotropic agent, high amounts thereof are not utilized.

With regard to the epoxy compound, a nonleachable type is preferred such that it does not leach out in the presence of solvents or fuels residing upon the final paint formulation. An example of one such specific epoxy resin in Epon 1001, manufactured by the Shell Chemical Company. Generally, this epoxy is 4,4'-isopropylidenediphenol-epichlorohydrin. Another suitable epoxy is D.E.R. 732, manufactured by the Dow Chemical Company. This epoxy is an epichlorohydrin-polyglycol reaction product. The amount of epoxy generally ranges from about 3 to about 7 parts by weight with from about 5 to about 6 being preferred, based upon 100 parts by weight of urethane polymer in the overall final polyurethane formulation.

Generally, any colorant such as a pigment or dye can be utilized in the cement component to impart a desired color. The amount can range from very small, e.g., from about 10 to about 15 parts by weight. Examples of various pigments include carbon black, titanium dioxide, chromic oxide, and the like. Of course, many other pigments in various amounts can be utilized to achieve a desired color or hue.

The amount of solvent in the cement component can vary over a wide range and exists in such amounts that when the three components are blended together, the total amount of solids in the overall paint formulation ranges from about 20 percent to about 60 percent by weight. Typically, the amount of solvent existing in the cement component ranges from about 25 parts by weight to about 250 parts by weight, with from about 50 to about 200 parts being desired, based upon 100 total parts by weight of urethane prepolymer in the formulation. The solvents can be any of the types utilized in the polymer component or the cure component. Thus, toluene, xylene, methyl ethyl ketone, methyl isobutyl ketone, and the like, or combinations thereof, can be utilized.

Each fraction or component of the polyurethane formulation of the present invention unexpectedly has very good stability and thus good shelf life. Thus the various separate components can be made and kept separate for a number of months and then brought together and mixed in any conventional manner and applied to a substrate. For example, the components can be fed through three separate lines to a spray gun where they are then mixed together and sprayed upon a desired substance or substrate. Generally, any conventional type of mixing device can be utilized as well as any conventional type of spraying apparatus such as any airless type of spray gun. The application of the polyurethane formulation to the substrate can be through a spray gun, through brushing, coating, or the like. Upon application, the various solvents evaporate and the mixture of aromatic diamine and aliphatic diamine ketimine curing agents reacts with the urethane prepolymer to yield a cured polyurethane formulation. Although cure can be at ambient temperature, that is for example at 65° F., generally heat can be applied to speed the curing operation. Cure can thus occur from about ambient temperature to about 180° F. and preferably from about 75° to about 120° F. Heating at higher temperatures tends to create a porous paint and, hence, is undesirable. Generally, any desired thickness can be applied at one application and any number of applications can be applied to yield a desired thickness. Usually, the final thickness can range from about 10 to about 50 mils.

With regard to the actual mixing, the three components are generally mixed simultaneously or within a short time period of one another, as for example a few minutes. Alternatively, the cement component can be mixed with the polymer component, but such cement-polymer mixture should be combined, with the cure component generally within a few days since stability of the cement-polymer component is not very good.

The polyurethane formulation, when prepared according to the present process, has good flexibility which is retained over long periods of time, good resistance to hydrolysis, and has excellent resistance to fuels, and the like. Moreover, the polyurethane forms a very good sealant coat. Accordingly, it can be utilized to contain fuels as for automobiles, aircraft, and the like. Thus, it can be sprayed as to the inside of a container, a fuel tank, a flexible rubber fuel tank, and the like. It can also be applied to an aircraft fuselage or wing to seal said area. Moreover, in the wing area, a sufficient coating can be made to form an integral fuel tank within the aircraft wing. That is, the polyurethane of the present invention can be sprayed over various integral parts and thereby seal them from the fuel. Such an application can result in approximately a 20 percent increase in the fuel tank area.

The following invention is further illustrated in the following representative examples.

EXAMPLE 1

The following general procedures were used to prepare the formulations designated A–G in the Tables.

The urethane component was prepared by mixing the prepolymer with the solvent in a container having an inert atmosphere therein such as a nitrogen atmosphere. Upon mixture thereof, the container was sealed with the inert gas to protect the contents from exposure to moisture. The cement component was made by adding the various ingredients to a container and mixing. Desirably, the cement component was sealed in an airtight container. The ketimine of the aliphatic diamine was prepared by adding a molecular sieve drying agent to a solution of the aliphatic diamine in an excess of a ketone solvent, usually a mixture of methyl ethyl ketone and methyl isobutyl ketone, the mixture was allowed to stand overnight and the molecular sieve was then removed by filtration or decantation and the aromatic diamine was added to the resulting solution of aliphatic diamine ketimine and the solution of the curing agents was stored in a sealed container until ready for use.

The individual components when thus prepared can be stored for relatively long periods of time without adverse effects. The formulations shown in the Tables were prepared by mixing the three components together and immediately spraying on a second treated cardboard surface for the purpose of preparing test samples. Portions of the sprayed Formulations A–G were tested as indicated in the Tables to determine their various physical properties. Formulations A and G are for control purposes and are outside the scope of the present invention. Formulations E and F are outside the preferred formulations of the present invention.

The room temperature pot life for Formulations A–F was found to be about 30 minutes and the pot life for Formulation G was found to be about one hour. When the ketimine of the aliphatic diamine was not first prepared in Formulations A–F, the pot life was found to be 4 minutes or less which is insufficient for most spraying or coating applications.

TABLE I

| | FORMULATION | | | | | | |
|---|---|---|---|---|---|---|---|
| | A | B | C | D | E | F | G |
| Prepolymer (% NCO = 3.35)* | 100.00 | 100.00 | 100.00 | 100.00 | 100.00 | 100.00 | 100.00 |
| Toluene | 56.26 | 56.76 | 56.76 | 56.76 | 56.76 | 56.26 | 56.26 |
| "MODAFLOW" | 1.00 | 1.00 | 1.00 | 1.00 | 1.00 | 1.00 | 1.00 |
| "EPON 1001-B-80" | 6.25 | 6.25 | 6.25 | 6.25 | 6.25 | 6.25 | 6.25 |
| "CABOSIL M-5" | 4.57 | 4.57 | 4.57 | 4.57 | 4.57 | 4.57 | 4.57 |
| Carbon black | 1.27 | 1.27 | 1.27 | 1.27 | 1.27 | 1.27 | 1.27 |
| Methyl ethyl ketone | 57.78 | 57.78 | 57.78 | 57.78 | 57.78 | 57.78 | 57.78 |
| Metaphenylene diamine (MPD) | — | 0.405 | 1.21 | 2.02 | 2.83 | 3.64 | 4.05 |
| Methyl ethyl ketone | — | 4.84 | 14.53 | 24.22 | 33.91 | 43.60 | 48.44 |
| Methylene-bis(cyclohexyl amine)($H_{12}$MDA) | 7.87 | 7.09 | 5.51 | 3.94 | 2.36 | 0.787 | — |
| Methyl ethyl ketone | 22.31 | 20.08 | 15.62 | 11.15 | 6.69 | 2.23 | — |
| Methyl isobutyl ketone | 22.31 | 22.08 | 15.62 | 11.15 | 6.69 | 2.23 | — |
| Molecular sieves, type 5A, ⅛" pellets | (1.87)** | (1.69) | (1.31) | (0.94) | (0.56)** | (0.19) | — |
| TOTAL | 279.67 | 279.63 | 279.62 | 279.61 | 279.61 | 279.62 | 279.62 |
| PERCENT SOLIDS | 42.8 | 42.7 | 42.4 | 42.1 | 41.9 | 41.6 | 41.4 |
| DIAMINE/DIISOCYANATE RATIO | 0.94 | 0.94 | 0.94 | 0.94 | 0.94 | 0.94 | 0.94 |
| AROMATIC DIAMINE/ALIPHATIC DIAMINE, WT. % | 0/100 | 10/90 | 30/70 | 50/50 | 70/30 | 90/10 | 100/0 |

*polyhexamethylene isophthalate/azelate having a molecular weight of 2,000 made with methylene-bis(4-cyclohexylisocyanate).
**molecular sieves were removed by screening just before the curing agent blends were mixed with the other components.

TABLE II

| Tensile strength (psi) Standing at Ambient Temperature for: | FORMULATION | | | | | | |
|---|---|---|---|---|---|---|---|
| | A | B | C | D | E | F | G |
| 2 hours | 1,000 | 600 | 226 | 155 | 150 | 120 | 120 |
| 4 hours | 1,761 | 1,331 | 722 | 653 | 600 | 494 | 588 |
| 24 hours | 2,830 | 2,929 | 2,706 | 2,712 | 2,877 | 2,932 | 2,335 |
| 41 days | 3,562 | 3,715 | 3,801 | 3,658 | 4,075 | 4,305 | 4,130 |
| 245 days | 3,295 | 3,660 | 3,777 | 3,801* | 4,135 | 4,591 | 5,054 |

*About 4,000 psi tensile is maximum desirable for flexibility needed to readily remove a full tank liner from the tank without causing damage to the liner.

EXAMPLE 2

A repeat of Example 1, B-D with isophorone diamine in place of $H_{12}MDA$ gave similar results.

EXAMPLE 3

A repeat of Example 1, B-D using 2,3-bis(aminomethyl)cyclohexane in place of $H_{12}MDA$ gave similar results.

EXAMPLE 4

A repeat of Example 1, B-D using ethylene diamine in place of $H_{12}MDA$ gave similar results.

EXAMPLE 5

A repeat of Example 1, B-D using metaxylene diamine in place of $H_{12}MDA$ gave similar results.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A process for preparing a urethane formulation comprising the steps of:
   separately preparing a polymer component, said polymer component comprising a urethane prepolymer and a urethane solvent;
   the amount of said urethane prepolymer in said urethane component is about 100 parts by weight, wherein said urethane prepolymer is the reaction product (1) an aliphatic polyisocyanate having from 5 to 25 atoms, and (2) a mixed polyester, said mixed polyester being (a) a copolymerization condensation product of, or (b) a separate physical blend of an aliphatic dicarboxylic acid having from 2 to 12 carbon atoms and an aromatic dicarboxylic acid having from 8 to 12 carbon atoms with a polyol having a molecular weight of 500 or less, the amount of said aliphatic dicarboxylic acid ranging from about 90 percent to about 10 percent by weight, this molecular weight of said polyester made from said acid and said polyol ranging from about 500 to about 4,000, and wherein the equivalent ratio of said isocyanate to the OH end groups in said polyester ranges from about 1.5 to about 3.0;
   separately preparing a curing component, said curing component consisting essentially of a mixture of an aromatic diamine, the ketimine of an aliphatic diamine and a curing agent solvent, the equivalent ratio of said curing agent to said isocyanate being from about 0.8 to about 1.2;
   separately preparing a cement component, said cement component comprising about 3 to about 7 parts by weight per 100 parts by weight of said urethane prepolymer of an epoxy having leaching resistance and a solvent;
   a thixotropic compound, said thixotropic compound located in said cement component, the amount of said thixotropic agent being from about 2 parts by weight to about 8 parts by weight per 100 parts by weight of said urethane prepolymer;
   maintaining said cement component separate from said polymer component and said curing agent, and maintaining said polymer component separate from said curing component, thereby maintaining stability of each of said components;
   the total amount of solids in said overall formulation ranging from about 20 percent to about 50 percent by weight based upon the total amount of said solvents and said solvents in said overall formulation.

2. The process of claim 1 wherein the curing component is composed of an aromatic diamine which is one selected from the group consisting of monocyclic aryl diamines containing from 6 to 12 carbon atoms and bicyclic aryl diamines containing from 12 to 20 carbon atoms and a ketimine, an aliphatic diamine selected from the group consisting of alkyl diamines containing from 2 to 10 carbon atoms, cycloalkyl diamines containing from 4 to 20 carbon atoms, and alkaryl diamines containing from 8 to 20 carbon atoms.

3. The process of claim 2 wherein the weight ratio of aromatic diamine to aliphatic diamine in the curing agent is in the range of from about 10:90 to 50:50.

4. The process of claim 3 wherein the amount of said thixotropic agent ranges from about 2 to about 8 parts by weight and wherein the amount of said epoxy ranges from about 3 to about 7 parts by weight.

5. The process of claim 4 wherein at least 90 percent of said polyisocyanate is an alkyl diisocyanate having from 6 to 10 carbon atoms or a cycloalkyl diisocyanate having from 8 to 15 carbon atoms, wherein said polyol forming said polyester is a glycol having from 2 to 10 carbon atoms, wherein said aliphatic dicarboxylic acid has from 6 to 9 carbon atoms, and wherein the equivalent ratio of said isocyanate to the hydroxyl end groups in said polyester ranges from about 1.8 to about 2.2.

6. The process of claim 5 wherein said polyester has a molecular weight of from about 1,000 to about 3,000, wherein said polyol forming said polyester has a molecular weight of 200 or less, wherein the amount of thixotropic agent ranges from about 3 parts to about 6 parts by weight, wherein the amount of solids in said urethane component ranges from about 50 to about 70 percent, wherein the amount of solids in said curing agent component ranges from about 5 to about 30 percent by weight, and wherein the amount of solvent in said cement component ranges from about 25 parts to about 250 parts by weight, based upon 100 parts by weight of said urethane polymer or prepolymer, wherein the equivalent ratio of total diamine in said curing agent component to isocyanate ranges from about 0.9 to about 0.95.

7. The process of claim 6 wherein said thixotropic agent is silicon dioxide, said epoxy is 4,4'-isopropylidenedipheno-epichlorohydrin and said polyol is hexane diol.

8. The process of claim 7 wherein said polyisocyanate is methylene (bis)-4-cyclohexylisocyanate), said aliphatic dicarboxylic acid is isophthalic acid, said aromatic diamine is metaphenylene diamine and said aliphatic diamine is a member selected from the group consisting of methylene bis(cyclohexyl amine), isophorone diamine, 1,3-bis-(aminomethyl)cyclohexane, ethylene diamine and metaxylene diamine.

9. The process of claim 8 which includes mixing together said polymeric component, said cement component and said curing component to form a polyurethane formulation and applying said polyurethane formulation to a substrate and curing said formulation at from ambient temperature to about 180° F.

10. The process of claim 9 wherein said substrate is an aircraft structure, a fuel tank or a flexible fuel container.

11. A process according to claim 9 wherein the substrate is an aircraft wing component.

12. A polyurethane, said polyurethane made by separately preparing a polymer component, a curing component and a cement component;

said polymer component comprising a urethane prepolymer and a urethane solvent, said curing component consisting essentially of a curing agent which is a mixture of an aromatic diamine, the ketimine of an aliphatic diamine and a curing agent solvent, said cement component comprising from about 3 to about 7 parts by weight per 100 parts by weight of said urethane prepolymer, an epoxy having solvent leaching resistance, and a solvent; the amount of said urethane prepolymer in said urethane component is about 100 parts by weight, wherein said urethane prepolymer is the reaction product of (1) an aliphatic diisocyanate having from 3 to 12 carbon atoms, or an alicyclic polyisocyanate having from 5 to 25 carbon atoms, (2) a mixed polyester, said mixed polyester being (a) a copolymerization condensation product of, or (b) a separate physical blend of, an aliphatic dicarboxylic acid having from 2 to 12 carbon atoms and an aromatic dicarboxylic acid having from 8 to 12 carbon atoms with a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000 and wherein the equivalent ratio of said isocyanate to the OH end groups in said polyester ranges from about 1.5 to about 3.0;

the equivalent ratio of said curing agent to said isocyanate being from about 0.8 to about 1.2;

a thixotropic compound located in said cement component, the amount of said thixotropic agent being from about 2 parts by weight to 8 parts by weight per 100 parts by weight of said urethane prepolymer;

said urethane being produced by maintaining said polymer component, said curing component, and said cement component separate from each other until prior to application, maintaining each said component separate from each other and thereby maintaining the stability of each of said components and subsequently mixing said three components together and curing at from about ambient temperature to about 180° F.

13. A polyurethane according to claim 12 wherein the curing agent is composed of an aromatic diamine which is one selected from the group consisting of monocyclic aryl diamines containing from 6 to 12 carbon atoms and bicyclic aryl diamines containing from 12 to 20 carbon atoms and a ketimine of an aliphatic diamine selected from the group consisting of alkyl diamines containing from 2 to 10 carbon atoms, cycloalkyl diamines containing from 4 to 20 carbon atoms, and alkaryl diamines containing from 8 to 20 carbon atoms.

14. The polyurethane of claim 13 wherein the weight ratio of aromatic diamine to aliphatic diamine in the curing agent is in the range of from about 10:90 to 50:50.

* * * * *